Patented Sept. 11, 1945

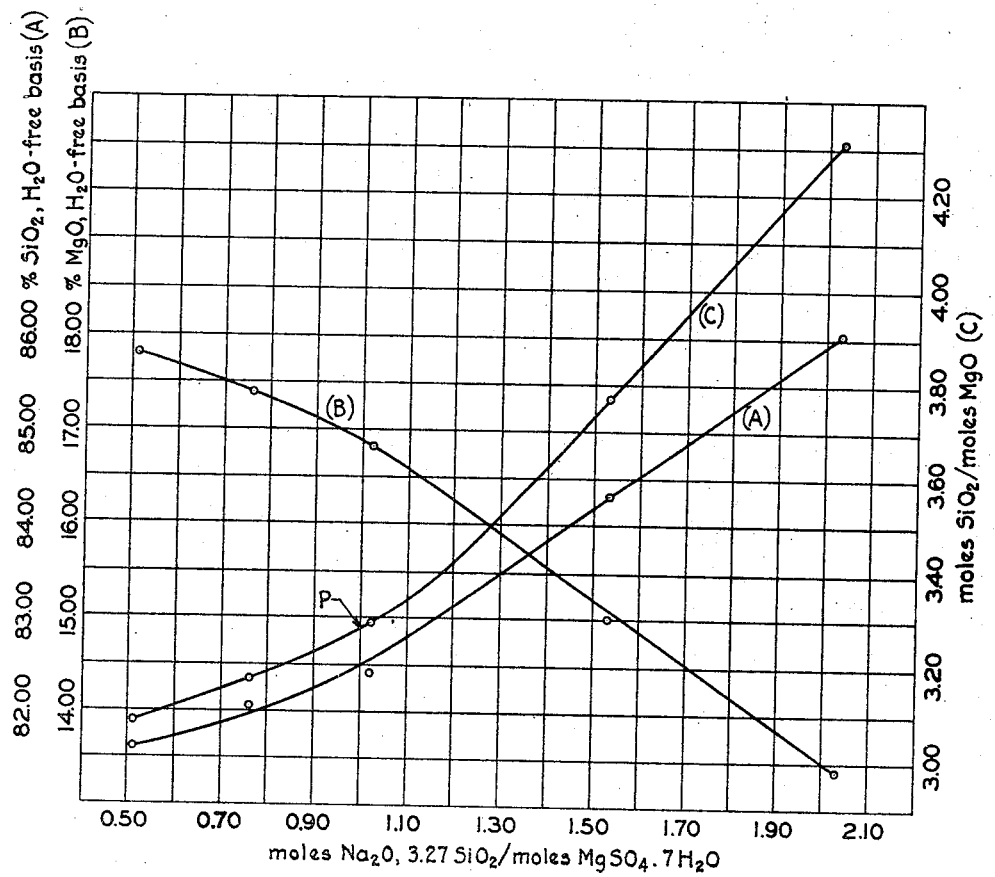

2,384,563

UNITED STATES PATENT OFFICE 2,384,563

MAGNESIUM SILICATES AND PROCESS FOR MAKING SAME

Reuben Roseman and Harry Eisenberg, Baltimore, Md., assignors, by mesne assignments, to Charles H. Burton, Baltimore, Md.

Application March 21, 1940, Serial No. 325,122

2 Claims. (Cl. 23—110)

This invention relates in general to a novel method for preparing a whole group of magnesium silicates, by the interaction of a magnesium salt and an alkali metal silicate, and more particularly to a method for preparing a group of synthetic magnesium silicates having molecular ratios, $MgO:SiO_2$, ranging from approximately 1:3.1 to 1:4.3, especially those of approximate ratios 1:3.2 to 1:3.6.

As the result of extensive clinical experience, preparations containing magnesium silicates comprehended by the above range have been found distinctly superior to other preparations employed for the treatment of peptic ulcers. The antidigestive, antacid, and adsorptive properties of these silicates further make them ideal constituents of weight-reducing agents (within limits, under proper medical control), dentifrices, chewing gums, etc., and also suited to a variety of other purposes which will be obvious to those skilled in the art.

Although the literature on the wet reaction between magnesium sulfate (or chloride) and sodium (or potassium) silicate extends as far back as 1839 (Döbereiner: "Analyse und Synthese des Meerschaums"), frequently the materials and the experimental procedures employed by previous workers for the production of various silicates of magnesium by means of this reaction are vaguely, if at all, described. Thus, typical of the state of the prior knowledge on this subject is the statement, "Alkaline silicates precipitate gelatinous magnesium silicate from magnesium salts; the precipitate is apparently $MgO.2SiO_2.2H_2O$," appearing in a well-known and authoritative treatise (eleven volumes) on inorganic chemistry (1926). This, despite the fact that no less than twenty magnesium silicates, ranging from $MgO,1.06SiO_2,1.7H_2O$ to $MgO,4.5SiO_2,2H_2O$, prepared by means of the above reaction, now appear in the scientific literature. Further, the misleading nature of the quoted statement will be apparent even to one unskilled in the art when it is recalled that no less than thirty different sodium silicates, ranging from $3Na_2O,2SiO_2$ to $Na_2O,4SiO_2$, are regularly produced and supplied by one concern alone in this country. To add to the confusion, some investigators and authors, in their chemical writing, have assigned incorrect formulae to some of the magnesium silicates obtained by previous workers.

The novelty of the present invention has its basis in the experimental observation that a number of different magnesium silicates may be prepared from one magnesium salt (magnesium sulfate) and one sodium silicate (molecular ratio, $Na_2O:SiO_2$=approximately 1:3.3) — merely by varying the proportions of these reactants. More specifically, we have found (among other things) that, under the experimental conditions delineated below, with increasing ratios of the amounts of reacting substances, moles $Na_2O,3.3SiO_2$/moles $MgSO_4.7H_2O$, the products show progressively increasing silica contents and correspondingly decreasing magnesia contents (water-free basis), with the attendant increasing ratios, moles $SiO_2$/moles MgO. We have further found that when, for the reactants, moles $Na_2O,3.3SiO_2$/moles $MgSO_4.7H_2O$ varies from approximately 0.5 to 2.0, then, for the products, moles $SiO_2$/moles MgO changes from approximately 3.1 to 4.3. Still further, a synthetic magnesium silicate, in which the molecular ratio, $MgO:SiO_2$, is the same as the molecular ratio, $Na_2O:SiO_2$, in the sodium silicate used in its preparation (approximately 1:3.3), results from the interaction of equal numbers of moles of the sodium silicate and magnesium sulfate.

The present invention, therefore, provides the data needed for determining the proportions of reactants required to produce any magnesium silicate in the range studied, and so represents a considerable advance over the prior state of the art.

To ascertain the exact extent of the variation in chemical composition of the products obtained when varying proportions of sodium silicate and magnesium sulfate are allowed to interact, we performed a number of experiments. Thus, in two series (preliminary and final) of carefully conducted experiments, solutions of sodium silicate were added to solutions of magnesium sulfate, the proportions employed embracing the range 0.5–2.0 for moles $Na_2O,3.3SiO_2$/moles $MgSO_4.7H_2O$. The precipitates so formed were freed from contaminating constituents by thorough washing, then dried, powdered, and analyzed.

The technique used in the preliminary series of three experiments (17, 29(a), and 29(b)) was essentially that of the final series of five experiments (1, 2, 3, 4, and 5). The following is a detailed description of the materials and the procedure employed in the latter series. See also Table 1.

*Materials*

Each solution of magnesium sulfate was made by dissolving Baker's C. P. salt in thirty times its weight of water.

The sodium silicate was "E" brand of the Philadelphia Quartz Company. It is a clarified liquid of specific gravity 1.384 (25° C.), which, upon careful analysis, was found to contain 8.86 per cent. $Na_2O$ and 28.06 per cent. $SiO_2$ (molecular ratio, $Na_2O:SiO_2 = 1:3.27$). (The manufacturers of this material state that it is a 40° Baumé liquid holding, according to a typical analysis,

| | Per cent | | Per cent |
|---|---|---|---|
| $Na_2O$ | 8.70 | CaO | 0.020 |
| $SiO_2$ | 28.06 | MgO | 0.042 |
| $Al_2O_3$ | 0.079 | Cl | 0.035 |
| $Fe_2O_3$ | 0.015 | $SO_3$ | 0.025 |
| $TiO_2$ | 0.036 | $CO_2$ | 0.038 |

(Molecular ratio, $Na_2O:SiO_2 = 1:3.33$).)

Prior to use in the experiments, each volume of "E" brand sodium silicate was diluted with 3.13 volumes of water, and the resulting solution was allowed to stand over night.

Technique

To the magnesium sulfate solution, the sodium silicate solution was added slowly (5–20 minutes) from a graduate (precipitation is immediate upon the first addition of sodium silicate solution), with stirring (by motor), stirring being then continued for an additional period (5 minutes) to insure thorough mixing. The precipitates were collected on "Hope" muslin supported by 1-gallon glass funnels, and were freed as completely as possible from adhering liquor by drainage; whereupon washing with distilled water was instituted and continued at least until portions of the washings showed no tests (or only extremely faint tests) for unreacted sodium silicate (with $MgSO_4$ or $BaCl_2$), sulfate (with $BaCl_2$, HCl), magnesium (with $NH_4Cl$, $NH_4OH$, $Na_2HPO_4$), and sodium (with zinc uranyl acetate), ample time being allowed for the formation of any precipitates in these tests. Thus, the precipitates from Experiments 1, 2, and 3 were each washed with approximately 28 liters of distilled water over a period of 13 days; while those from Experiments 4 and 5 were each washed with approximately 63 liters of distilled water over a period of 26 days, these latter precipitates proving to be exceedingly resistant to purification. Throughout the washing operation the precipitates in the funnels were protected from dust by means of large watch glasses.

The precipitates were then carefully transferred from the muslin to small, porcelain-lined trays, and were dried in an electric oven set at 60–65° C. The resulting materials were pulverized in porcelain mortars, following which they were air-dried over night, weighed, and stored in cork-stoppered bottles.

The synthetic silicates were analyzed by reliable and well-known methods, taking all of the precautions characteristic of refined quantitative analysis. The results are given in Table 2, wherein are also given, for each sample, the silica and magnesia contents on a water-free basis, as well as the molecular ratio, $MgO:SiO_2$.

*Table 1.—Résumé of experiments*

| Experiment (conducted at room temperature) | C. P. $MgSO_4.7H_2O$, g. | "E" brand sodium silicate, cc. | $\frac{\text{Moles } Na_2O.3.27SiO_2}{\text{Moles } MgSO_4.7H_2O}$ [1] | Yield g. [2] | Remarks |
|---|---|---|---|---|---|
| PRELIMINARY SERIES | | | | | |
| 17 | 100.9 | 230 | (1.11) | 117.6 | Material collected and washed on cotton gauze and paper in large Büchner funnel). Tap water used throughout. Washing period = 3 days. |
| 29 (a) | 20.2 | 69 | (1.66) | 24.2 | Tap water used throughout. Washing period = 5 days. |
| 29 (b) | 40.4 | 46 | (0.55) | 22.8 | Tap water used throughout. Washing period = 4 days. |
| FINAL SERIES | | | | | |
| 1 | 61.6 | 64.5 | 0.51 | 28.8 | Distilled water used throughout. |
| 2 | 61.6 | 96.8 | 0.76 | 45.9 | Do. |
| 3 | 61.6 | 129.0 | 1.02 | 60.6 | Do. |
| 4 | 61.6 | 193.6 | 1.53 | 61.2 | Do. |
| 5 | 61.6 | 257.5 | 2.03 | 63.0 | Do. |

[1] The ratios given in parentheses were obtained by assuming that the values actually found for the specific gravity (1.384, 25° C.) and the $Na_2O$ and $SiO_2$ contents (8.86 per cent. and 28.06 per cent., respectively) of the sample of "E" brand sodium silicate used in the final series of experiments were applicable to the previously purchased and unanalyzed sample of "E" brand employed in the preliminary series of experiments.
[2] Somewhat cloudy filtrates observed in the course of collecting and washing the precipitates, solubility effects, and slight manipulative losses resulted in a loss of some material.

*Table 2.—Analyses*

| | Preliminary series | | | Final series | | | | |
|---|---|---|---|---|---|---|---|---|
| | 17 | 29 (a) | 29 (b) | 1 | 2 | 3 | 4 | 5 |
| Per cent $SiO_2$ | 65.81 | 69.88 | 67.66 | 66.05 | 66.96 | 68.05 | 71.47 | 72.73 |
| Per cent MgO | 12.83 | 11.07 | 13.60 | 14.40 | 14.19 | 13.89 | 12.72 | 11.34 |
| Per cent $H_2O$ | 20.42 | 17.24 | 18.04 | 19.08 | 18.40 | 17.44 | 15.22 | 15.45 |
| Per cent $R_2O_3$ | 0.37 | 0.55 | 0.37 | 0.35 | 0.21 | 0.34 | 0.44 | 0.30 |
| Per cent CaO | 0.26 | 0.96 | 0.29 | 0.01 | 0.01 | 0.01 | 0.04 | 0.08 |
| Per cent $Na_2O$ | 0.06 | 0.05 | 0.03 | 0.01 | 0.01 | 0.04 | 0.02 | 0.02 |
| Per cent $SO_3$ | 0.04 | 0.02 | 0.02 | None | 0.01 | None | 0.01 | ([1]) |
| Per cent total | 99.79 | 99.77 | 100.01 | 99.90 | 99.79 | 99.77 | 99.92 | 99.93 |
| Per cent $SiO_2$, $H_2O$-free basis | 82.70 | 84.44 | 82.55 | 81.62 | 82.06 | 82.42 | 84.30 | 86.03 |
| Per cent MgO, $H_2O$-free basis | 16.12 | 13.38 | 16.59 | 17.80 | 17.39 | 16.82 | 15.00 | 13.41 |
| Molecular ratio, $MgO:SiO_2$ | 1:3.44 | 1:4.24 | 1:3.34 | 1:3.08 | 1:3.17 | 1:3.29 | 1:3.77 | 1:4.31 |

[1] Trace (< 0.01%).

On the drawing, the figure depicts graphically the effect of varying the proportions of the reacting sodium silicate and magnesium sulfate upon the chemical composition of the resulting products, and was obtained by plotting the ratios, moles $Na_2O,3.27SiO_2$/moles $MgSO_4.7H_2O$ (from Table 1, final series), as abscissas, against the corresponding (A) $SiO_2$ percentages, on a water-free basis,
(B) MgO percentages, on a water-free basis, and  (from Table 2, final series)
(C) ratios, moles $SiO_2$/moles MgO, respectively, as ordinates.

From Tables 1 and 2 and the drawing, it will be seen that, under the conditions of the present experiments:

1. With increasing ratios of the amounts of reacting substances, moles $Na_2O,3.27SiO_2$/moles $MgSO_4.7H_2O$, the products show progressively increasing silica contents and correspondingly decreasing magnesia contents (water-free basis), with the attendant increasing ratios, moles $SiO_2$/moles MgO.

2. When, for the reactants, moles $$Na_2O,3.27SiO2/moles$$

$MgSO_4.7H_2O$ varies from 0.51 to 2.03, then, for the products, moles $SiO_2$/moles MgO changes from 3.08 to 4.31. Or (confining ourselves to the range of clinically-proven therapeutic utility and reasonable reagent economy), when, for the reactants, moles $Na_2O,3.27SiO_2$/moles $MgSO_4.7H_2O$ varies from 0.80 to 1.40, then, for the products, moles $SiO_2$/moles MgO changes from 3.19 to 3.63.

3. A synthetic magnesium silicate, in which the molecular ratio, $MgO:SiO_2$, is the same as the molecular ratio, $Na_2O:SiO_2$, in the sodium silicate used in its preparation (1:3.27), results from the interaction of equal numbers of moles of the sodium silicate and magnesium sulfate, that is, where moles $Na_2O,3.27SiO_2$/moles $$MgSO_4.7H_2O=1.00$$

(point P, the drawing).

4. Excesses of the reactant sodium silicate are more effective than equivalent excesses of the reactant magnesium sulfate in altering the product ratio, silica: magnesia.

5. Thorough washing of the precipitated magnesium silicates makes it possible to obtain preparations that are essentially free of sodium (and sulfate), even where a considerable excess of sodium silicate has been employed as precipitant, as in experiment 5.

The noteworthy amounts of calcium in the products of the preliminary series of experiments, more especially experiment 29(a), may be derived from the tap water used in these experiments by base-exchange, by adsorption, and as the result of contamination by precipitated calcium silicate coming from the interaction of dissolved calcium compounds and sodium silicate.

Concerning yields (see Column 5, Table 1): If it is assumed first, that the ratio, $MgO:SiO_2$, in each original precipitate (the precipitate obtained after mixing in all of the sodium silicate with the magnesium sulfate, prior to the filtration and washing operations) is the same as the ratio found in the corresponding final product (the end product of the process—the material analyzed), and second, that where moles $$Na_2O,3.27SiO_2/moles$$

$MgSO_4.7H_2O$ is less than 1.00, the MgO in the original precipitate is equivalent in amount to the $Na_2O$ in the sodium silicate, and that where moles $Na_2O,3.27SiO_2$/moles $MgSO_4.7H_2O$ is greater than 1.00, the MgO in the original precipitate is equivalent in amount to the magnesium sulfate, then simple calculations will show that the yields in Experiments 1, 2, 3, 4, and 5 are, respectively, 80, 85, 84, 77, and 71 per cent. of the "theory."

As an example of the antacid qualities of our synthetic materials the following data (Table 3) are presented, showing the rate of reaction of the product of Experiment 17, above, with hydrochloric acid. The experiments were conducted at room temperature, with occasional shaking of the reaction flasks.

Table 3

| Sample, g. + N/14 HCl, cc. | | Time, hrs. | N/14 NaOH, cc. (back-titration) [1] | N/14 HCl neutralized, cc. |
|---|---|---|---|---|
| 0.500 | 50.0 | 0.25 | 27.1 | 22.9 |
| 0.500 | 50.0 | 0.50 | 24.0 | 26.0 |
| 0.500 | 50.0 | 1 | 21.5 | 28.5 |
| 0.500 | 50.0 | 2 | 15.2 | 34.8 |
| 0.500 | 50.0 | 3 | 12.4 | 37.6 |
| 0.500 | 50.0 | 36 | 6.2 | 43.8 |

[1] Indicator: Brom phenol blue.

The following is a specific example of a way of employing our invention or discovery.

Dissolve 22 lbs. 4 oz. $MgSO_4.7H_2O$ (U. S. P.) in 80 gallons tap water contained in a glass-lined tank.

To this magnesium sulfate solution is added, slowly, a previously prepared solution of 23,000 cc. sodium silicate solution (40° Baumé, brand "E," Philadelphia Quartz Co.) in 72,000 cc. tap water, with vigorous and thorough agitation of the mixture. Stirring of the precipitated magnesium silicate is continued for 15 to 30 minutes, or until a smooth, homogeneous suspension results.

The mix is now transferred to large canvas or duck filtering bags, suspended over suitable drains and having tap water inlets at the tops; and, after adhering liquor has drained off, the precipitate is washed, by suitable water additions with intimate mixing, draining, of course, proceeding all the while. The washing is continued until portions of the drippings show no tests (or only faint tests) for sulfate (with $BaCl_2$,HCl) and sodium (with zinc uranyl acetate). (The washing operation as outlined here is inordinately time-consuming, requiring several days, and on a large scale is most efficiently performed with the aid of a filter press.)

The washed material, freed as completely as possible from adhering liquid, is spread in thin layers (one-eighth to one-half inch) in shallow, stainless steel or chromium-plated pans, and is allowed to dry in a warm room or oven, the drying temperature preferably not exceeding 65° C. A little experience enables one to tell when the drying operation is completed, the material then being uniformly very white and easily cracked. Yield of silicate: at least 22 lbs.

The dried silicate is pulverized until the material is impalpable; it is then sifted through a 100 (or more)-mesh sieve, whereupon it is ready to be used, either alone, or in admixture with other materials, for antidigestant, antacid, adsorbent, or other purposes. Thus, a powder consisting of:

| | Parts |
|---|---|
| Synthetic silicate | 55.6 |
| Calcium carbonate | 40.3 |
| Sodium bicarbonate | 2.3 |
| Diammonium hydrogen phosphate (or magnesium ammonium phosphate) | 1.6 |

(flavored with oil of peppermint and saccharin) has found great utility in the field of peptic ulcer therapy.

The invention or discovery as hereinabove set forth is embodied in particular form and manner but the invention or discovery may be variously embodied within the scope of the following claims.

We claim:

1. A method of preparing a magnesium silicate of definite chemical composition with a molecular ratio, $MgO:SiO_2$, within the range of substantially 1:3.1–1:4.3, comprising: reacting a solution of magnesium sulfate with a solution of sodium silicate having the formula $Na_2O, 3.3SiO_2$, the ratio moles $Na_2O, 3.3SiO_2$/moles $MgSO_4.7H_2O$ being within the range of substantially 0.5–2.0, and in the absence of treatment for further chemical reaction on the product of that reaction; thoroughly washing the precipitated magnesium silicate to free it essentially of contaminating constituents; drying the washed precipitate at a temperature not in excess of substantially 65° C.; and pulverizing the dried silicate.

2. A method of preparing a magnesium silicate of definite chemical composition with a molecular ratio, $MgO:SiO_2$, within the range of substantially 1:3.2–1:3.6, comprising: reacting a solution of magnesium sulfate with a solution of sodium silicate having the formula $Na_2O, 3.3SiO_2$, the ratio moles $Na_2O, 3.3SiO_2$/moles $MgSO_4.7H_2O$ being within the range of substantially 0.8–1.4, and in the absence of treatment for further chemical reaction on the product of that reaction; thoroughly washing the precipitated magnesium silicate to free it essentially of contaminating constituents; drying the washed precipitate at a temperature not in excess of substantially 65° C.; and pulverizing the dried silicate.

REUBEN ROSEMAN.
HARRY EISENBERG.